United States Patent
Neumann (10) Patent No.: US 8,783,127 B2
(45) Date of Patent: Jul. 22, 2014

(54) PARALLEL-KINEMATICAL MACHINE

(75) Inventor: Karl-Erik Neumann, Älvsjö (SE)

(73) Assignee: Eexchon AB, Sollentuna (SE)

( * ) Notice: Subject to any disclaimer, the term of this patent is extended or adjusted under 35 U.S.C. 154(b) by 1334 days.

(21) Appl. No.: 11/719,117

(22) PCT Filed: Nov. 3, 2005

(86) PCT No.: PCT/SE2005/001651
§ 371 (c)(1),
(2), (4) Date: Mar. 4, 2009

(87) PCT Pub. No.: WO2006/054935
PCT Pub. Date: May 26, 2006

(65) Prior Publication Data
US 2009/0205457 A1 Aug. 20, 2009

(30) Foreign Application Priority Data
Nov. 18, 2004 (SE) ....................... 0402824

(51) Int. Cl.
*B25J 18/04* (2006.01)
(52) U.S. Cl.
USPC .......................... 74/490.01; 901/14
(58) Field of Classification Search
USPC ............. 414/735; 74/490.03, 490.01, 490.07, 74/490.08; 901/14, 15
See application file for complete search history.

(56) References Cited

U.S. PATENT DOCUMENTS

| | | | | |
|---|---|---|---|---|
| 4,407,625 A | * | 10/1983 | Shum | 414/728 |
| 4,569,627 A | * | 2/1986 | Simunovic | 414/735 |
| 4,732,525 A | * | 3/1988 | Neumann | 414/729 |
| 4,819,496 A | | 4/1989 | Shelef | 74/490.03 |
| 2013/0087004 A1 | * | 4/2013 | Neumann et al. | 74/490.01 |

FOREIGN PATENT DOCUMENTS

| | | |
|---|---|---|
| DE | 19952423 | 5/2001 |
| EP | 0482268 | 4/1992 |
| FR | 2800659 | 5/2001 |

* cited by examiner

*Primary Examiner* — David M Fenstermacher
*Assistant Examiner* — Terence Boes
(74) *Attorney, Agent, or Firm* — Nixon & Vanderhye PC (57) ABSTRACT

A parallel-kinematical machine includes at least three length adjusting setting devices that are connected to a positioning head and a base. The positioning head is movable in response to manuvering of the setting devices. At least movable two reinforcing beams are connected to the positioning head via beam rotation bearings having one degree of freedom, and are adapted to slide transversely in the beam bearings with adjustments of the setting devices. Each beam bearing is connected to the base via a beam-universal-joint. The beam bearing of at least one movable reinforcing beam is connected to an inner gyro element mounted in an outer gyro element, and rotatable about inner and outer gyro axes of the inner and outer gyro elements, so as to be partly rotatable about an axis that parallels the longitudinal axis of the movable reinforcing beam.

32 Claims, 7 Drawing Sheets

PARALLEL-KINEMATICAL MACHINE

TECHNICAL FIELD

The present invention relates to the field of machine tools and then particularly to robots intended for work in the industry.

BACKGROUND OF THE INVENTION

U.S. Pat. No. 4,732,525 (corresponding to SE 452279) teaches a parallel-kinematical machine in the form of a robot of conventional design. The robot includes three setting devices, which can be lengthened and shortened, in combination with a central tube that carries a positioning head at one end thereof. The central tube is also mounted for movement in its axial direction through the medium of a central bearing in the form of a universal joint, which provides three degrees of freedom in relation to the machine base. Each setting device is connected to the positioning head via a joint that provides three degrees of freedom and also to the machine base via a joint that has two degrees of freedom, so as to enable the positioning head to move within a limited working range. The setting devices take-up solely tensile forces and pressure forces, whereas the central tube takes-up all rotational forces and bending stresses from loads on the positioning head.

The accuracy of the movements of such a machine depends greatly on its rigidity, which, in turn, depends on the number of bearings/degrees of freedom available and also on the ability of the component materials to minimise torsional stresses and bending stresses in critical directions. For instance, it can be mentioned that large lateral forces in respect of the positioning head result in a tendency of the central tube to bend and/or to be rotated between its gyro bearing in the machine base and its connection with the setting devices.

The rigidity of the described conventional machine thus depends, among other things, on the design of the connection of the setting devices with the positioning head and also on the intrinsic rigidity of the central tube per se. In order to enhance the rigidity of such a conventional machine it is necessary, primarily, to apply stricter tolerances in each joint and, secondarily, to use a more robust central tube, therewith adding a weight increase.

The central tube can be made more robust, by using a stiffer material and/or by increasing the thickness of the tube and/or increasing its diameter.

All such improvements in machine rigidity, however, result in higher costs, heavier machine and a reduction in the working area within which the positioning head can be manoeuvred.

Similar parallel-kinematical machines are also known, for instance, from UK Patent Application 8319708 (2,143,498), U.S. Pat. No. 4,569,627 and NO 148216.

However, none of these known machines has a basic construction that permits the level of rigidity and therewith the level of accuracy to which modern machines aim.

OBJECT OF THE INVENTION

One object of the present invention is to provide a parallel-kinematical machine whose rigidity and therewith its desired accuracy, is greater than that of earlier known parallel-kinematical machines, in combination with a simple construction that contributes towards relatively low manufacturing costs.

A further object is to provide such a machine that lacks a central tube, so as to improve the mobility of the positioning head in its working range and therewith also contribute to the achievement of a simple construction and relatively low manufacturing costs.

In conjunction, another object is to reduce the moving mass of such a machine.

DISCLOSURE OF THE INVENTION

These objects are achieved by means of the present invention as defined in the accompanying independent patent claim. Suitable further embodiments of the invention will be apparent from the accompanying dependent patent claims.

The invention relates to a parallel-kinematical machine that includes at least three setting devices which can be lengthened and shortened individually in their longitudinal directions. Each setting device is connected to a positioning head via a first joint and also to a machine base via an appropriate universal joint, which may have the form of a gyro device or a ball screw. The positioning head can hereby be moved within a working range, by maneuvering the setting devices. At least two movable reinforcing beams are connected to the positioning head, via a respective beam-rotational-bearing, each having only one degree of freedom. Each reinforcing beam is arranged to slide transversely in a base-carried beam bearing when one or more of the setting devices is lengthened or shortened. In addition, each beam bearing is connected to the machine base via a beam-universal-joint and the beam bearing of at least one movable reinforcing beam is (a) connected to an inner gyro element mounted in an outer gyro element of the beam bearing's respective beam-universal-joint mounted in the base, the inner gyro element being rotatable about an inner gyro axis and the outer gyro element being rotatable about an outer gyro axis, and (b) rotatable about the inner and outer axes so as to be (c) partly rotatable about an axis that parallels the longitudinal axis of the movable at least one reinforcing beam.

Figure 6:
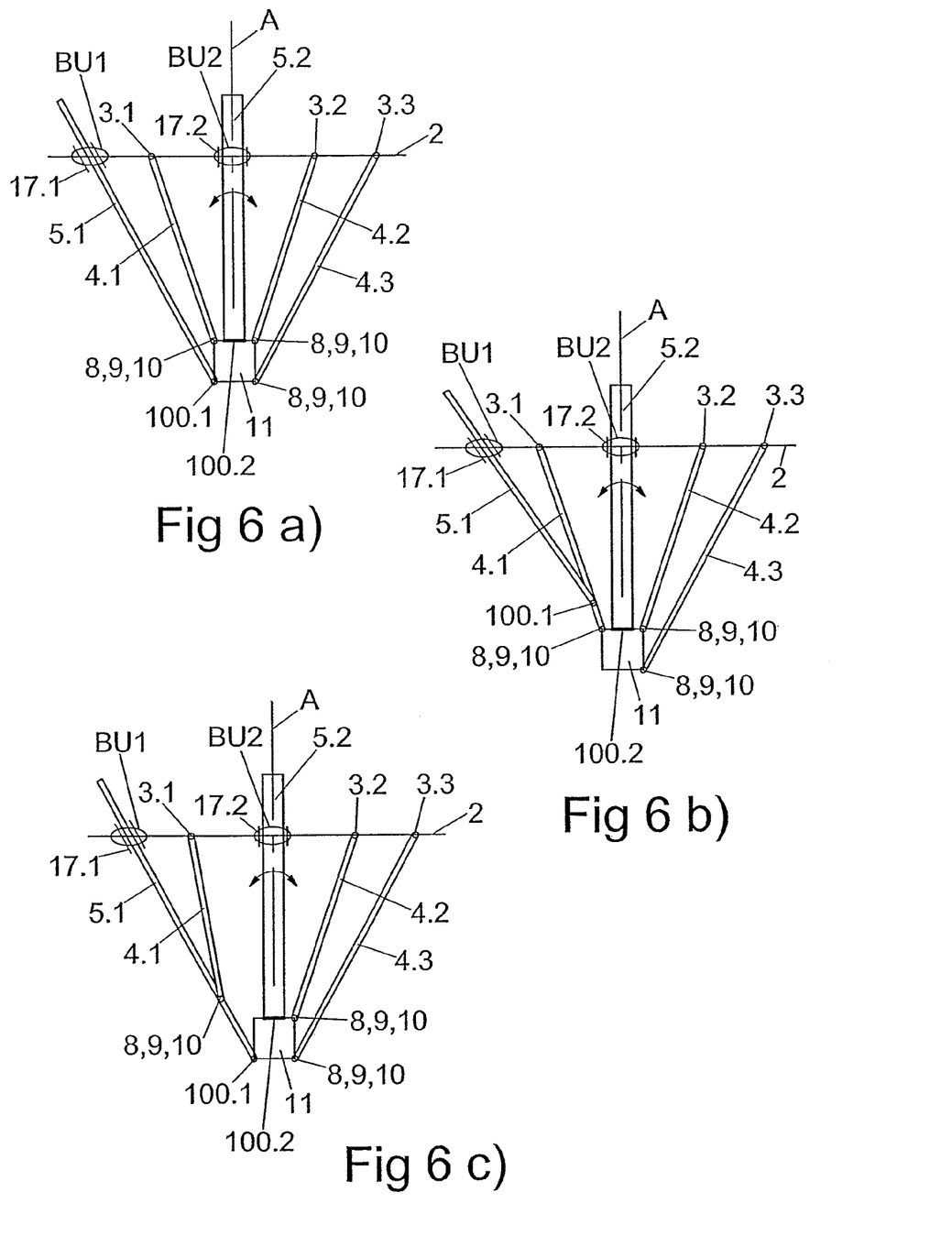

This concept gives rise to a number of feasible basic embodiments of the relationship between the machine base, the setting devices, the reinforcing beams and the positioning head with regard to the mutual relationship of these components on the one hand and the component bearings in the machine base and in the positioning head on the other hand, as will be evident from the following part of the description made with reference to FIG. 6.

The detailed embodiment described below includes three setting devices, each of which is connected to its respective reinforcing beam, wherein the second setting device is also provided with an additional reinforcing beam.

The universal joint includes an outer gyro element which is mounted in the aforesaid base for rotation about an outer gyro axis, and further includes an inner gyro element mounted in said outer gyro element for rotation about an inner gyro axis at right angles to the outer gyro axis. In this case, the beam bearing is preferably connected to the inner gyro element of the universal joint. In the case of other embodiments, the beam bearing may be separate from the universal joint of the setting device, but connected to an own universal joint in spaced relationship with the universal joint of the setting device, which, however, requires an own beam rotational bearing for connection of the reinforcing beam to the positioning head.

As will be evident from the illustrated embodiment, the first joint is given only one degree of freedom, therewith giving the machine its rigidity while eliminating the requirement of a central tube.

Each reinforcing beam is adapted to present in a first direction a bending resistance that greatly exceeds its bending resistance in a direction at right angles to the first direction. This enables the reinforcing beam to have a generally rectangular cross-sectional shape or an elliptical cross-sectional shape. It will be understood, however, that other cross-sectional shapes are conceivable within the scope of the invention, such as I-beams, for instance. The reinforcing beam will preferably be made of a composite material reinforced with carbon fibres.

The machine according to the embodiment shown in detail includes three setting devices, each of which is permanently connected to a reinforcing beam at said first joint. One of the setting devices is also provided with an additional reinforcing beam with the intention of obtaining generally the same rigidity in all directions. As indicated above, the machine may conceivably be provided with solely two reinforcing beams positioned at right angles to one another. The beam bearing of at least one reinforcing beam is rotatable about its own longitudinal axis or about an axis in its base bearing parallel with said own longitudinal axis. In this illustrated embodiment, the twin reinforcing beams are rotatable about the setting device in the inner gyro element.

Each setting device of the illustrated embodiment is comprised of a screw-nut-mechanism whose nut is permanently connected to the inner gyro element. It will be understood, however, that other machine designs having other types of setting devices are fully conceivable within the scope of the invention. For example, linear motors may be used as setting devices instead of the illustrated screw-nut-mechanism. Such a linear motor may even consist of the reinforcing beam or comprise a part thereof.

Each reinforcing beam includes at least one longitudinally extending first slide element, for example a steel slide bar which may be glued and firmly screwed to the beam, said first slide element being connected in a shape-locked fashion to but slideable in relation to a second slide element, for instance a guide rail, which is connected to the nut, either directly or indirectly, via an intermediate bearing. In the case when the second slide element is connected to the nut indirectly via an intermediate bearing, the second slide element is guided relative to the nut in a shape-wise fashion by virtue of being able to tilt around the setting device, as evident from the illustrated embodiment of the universal bearing with the twin reinforcing beams. Although the illustrated embodiment shows that the reinforcing beams can be rotated about an axis that extends parallel with the symmetrical longitudinal axis of the reinforcing beam by permitting rotation in the inner gyro element, it will be understood that corresponding rotation can be achieved by mounting the whole of the universal joint for rotation in the machine base, i.e. the outer gyro element of said joint.

The screw or the nut is rotatably driven by a setting device motor. When it is the screw that is driven by the motor, the motor is connected to one end of the screw, whereas the other end of said screw is supported by a support bearing. In the case of the embodiment shown in detail, the setting device motor is mounted in a motor holder whose one end is provided with one part of said first joint and which also includes connection surfaces against which one or more reinforcing beams is/are intended to be fastened. The motor holder holding the setting device motor may alternatively be mounted at the other end of the screw in relation to what is shown, wherewith the "motor-free" end of the screw is connected to the first joint in this case. When it is the nut that is driven by the motor, the drive can be effected, for instance, via a belt drive or the like so that the ratio of the setting device to the motor can be readily changed.

Two of the first joints at the positioning head include mutually parallel joint axes whereas the third of said first joints at said positioning head includes a joint axis that extends at right angles to the other two. In addition, the inner gyro axis of the universal joint of each setting device is parallel with the joint axis of the first joint of the setting device in respect of those joints that do not allow tilting, i.e. rotation of the reinforcing beam about an axis parallel with its own symmetrical longitudinal axis in the joint.

The embodiment shown in detail provides a parallel-kinematical machine whose universal joints include two joints that each have two degrees of freedom and one joint that has three degrees of freedom, and only one degree of freedom with regard to each of the beam rotational bearings of the machine, i.e. at the positioning head.

It will be understood that the number of reinforcing beams provided and their cross-sectional dimensions can be varied in accordance with the invention. It will also be understood that the number of degrees of freedom of the first joint, i.e. the setting device joint in respect of the positioning head, may be varied provided that the beam rotational bearing is not common with the first joint.

BRIEF DESCRIPTION OF THE DRAWINGS

The invention will now be described in more detail with reference to an exemplifying embodiment thereof illustrated in the accompanying drawings, in which

FIGS. 6a)-e) illustrate schematically five different basic types of embodiments according to the present invention.

DESCRIPTION OF THE INVENTION

Figure 1:
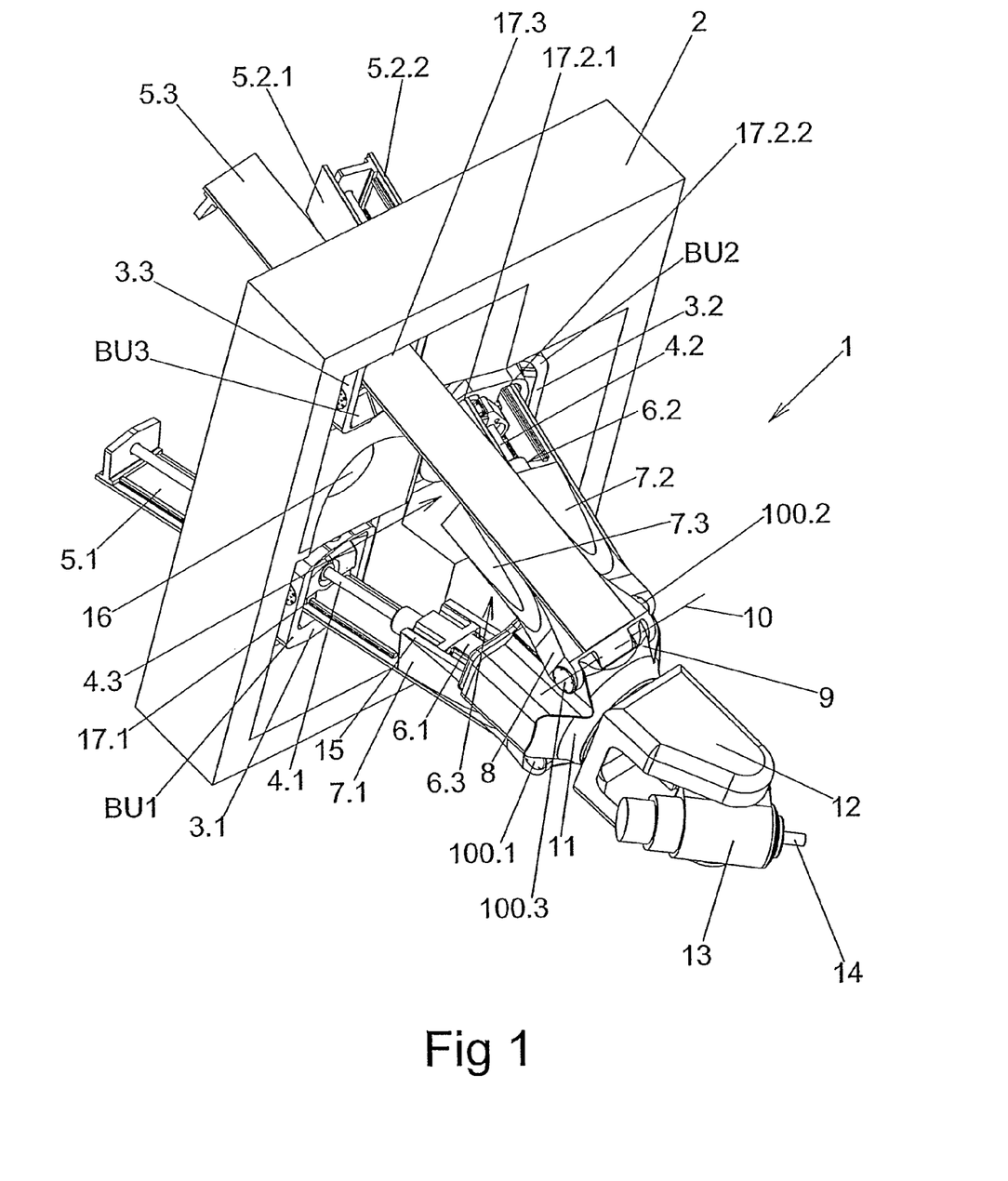
FIG. 1 illustrates a machine embodiment according to the present invention.

FIG. 1 illustrates an embodiment of a parallel-kinematical machine 1 according to the present invention. The machine includes a base 2 in which three separate universal joints 3.1, 3.2, 3.3 are mounted in three corresponding through-penetrating openings in the base. Extending through each universal joint is a setting device 4.1, 4.2, 4.3 and a reinforcing beam or bar 5.1, 5.2.1, 5.2.2, 5.3. When the universal joint relating to the setting device is not coincidental with the universal joint relating to the reinforcing beam, the universal joint of the reinforcing beam for the beam universal joint is referenced BU1, BU2, BU3. The setting device has the form of a screw-nut-mechanism whose nut is rigidly connected to the universal joint. The setting device screw is driven by a setting motor 6.1, 6.2, 6.3 mounted in a motor holder 7.1, 7.2, 7.3 which, in turn, is provided at its end with one part 8 of a first joint that co-acts with the other part 9 of the joint for rotation about a joint axis 10. The other part 9 of the joint is rigidly connected to a positioning head 11. The first joint 8, 9, 10 of the FIG. 1 embodiment thus functions as a beam rotational bearing 100.3 in respect of the reinforcing beam 5.3 and, in this case, acts as a hinge that has only one degree of freedom. Other motor holders 7.1, 7.2 are connected correspondingly to the positioning head, via an individual beam rotational bearing 100.1, 100.2. The positioning head 11 is then connected typically to a manoeuvring head 12, a tool head 13, and a tool attachment means 14, for movement of a tool within a working range. The motor holder 7.1, 7.2, 7.3 also includes on two opposite sides connecting surfaces 15 against which the reinforcing beams 5.1, 5.2.1, 5.2.2, 5.3 are fastened. As will also be seen from FIG. 1, the base is provided with a media window 16 for the accommodation of cables and the like.

Each reinforcing beam 5.1, 5.2, 5.3 is arranged for transversal sliding movement in a beam bearing 17.1, 17.2.1, 17.2.2, 17.3 in the base 2 when lengthening or shortening the setting device 4.1, 4.2, 4.3. The beam bearing 17.1, 17.2.1, 17.2.2, 17.3 according to the FIG. 1 embodiment is arranged in the beam-universal joint BU1, BU2, BU3 that coincides with the universal joints 3.1, 3.2, 3.3 of respective setting devices.

As will be seen from FIG. 1, one of the setting devices, the second setting device 4.2, includes two reinforcing beams 5.2.1, 5.2.2, which are placed on a respective side of the setting device connected to said beams, and orientated generally at right angles to the remaining two reinforcing beams 5.1, 5.3 at the two other setting devices 4.1, 4.3. As a result of this reinforcing beam duplication, all reinforcing beams in the machine may be given the same dimensions and will take-up forces of equally large magnitudes.

Figure 2:
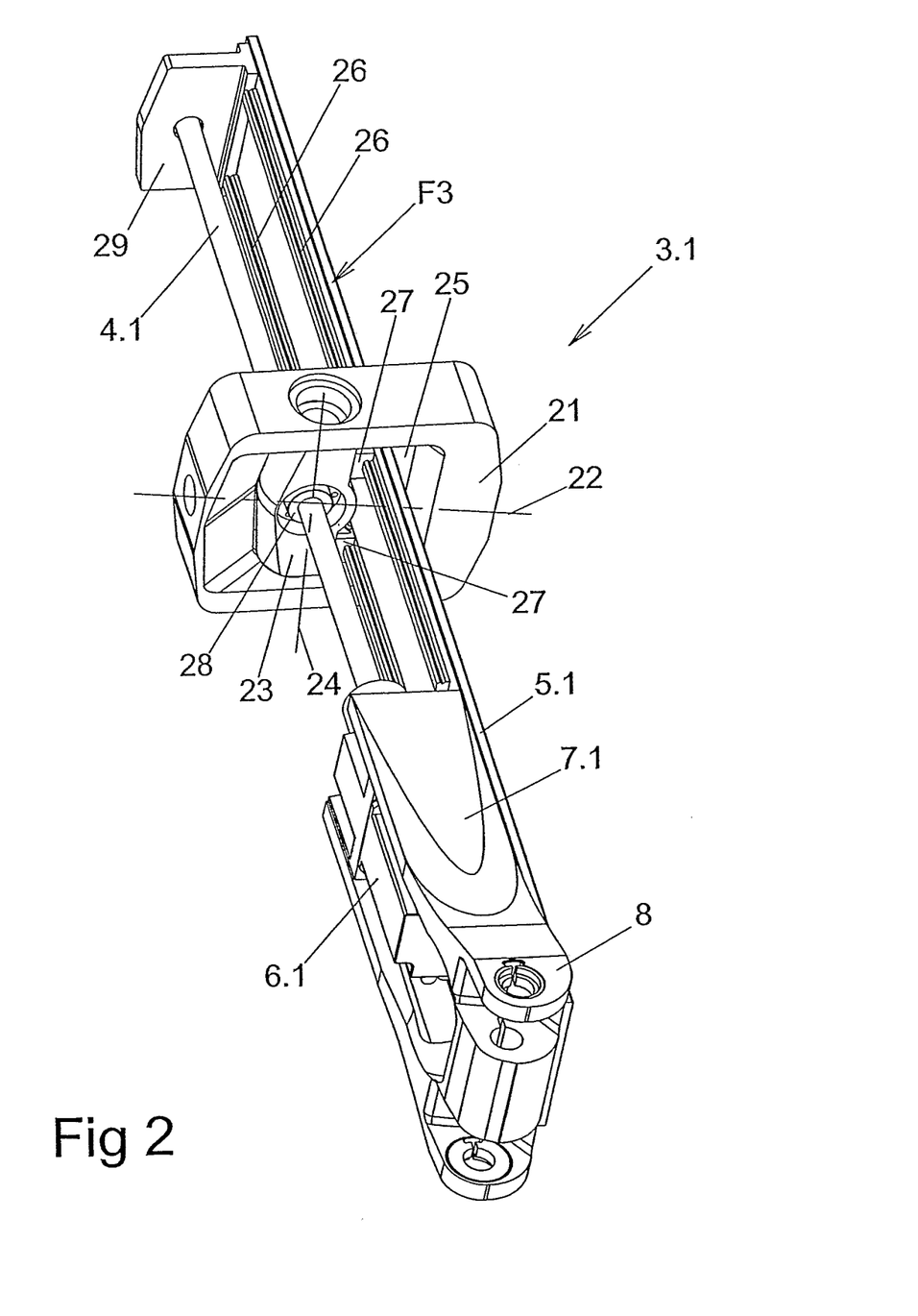
FIG. 2 illustrates one of the reinforcing beams of the machine according to FIG. 1, with connected setting device.

FIG. 2 shows a first setting device 4.1 in combination with a reinforcing beam 5.1 and identically similar to a third setting device 4.3 in FIG. 1. The universal joint 3.1 includes an outer gyro element 21, which is mounted in the base for rotation about an outer gyro axis 22, and which further includes an inner gyro element 23 which is mounted in the outer gyro element 21 for rotation about an inner gyro axis 24. The reinforcing beam 5.1 also extends through a gyro window 25 in the universal joint, wherein the setting device 4.1 and the reinforcing beam 5.1 are able to move uniformly as a unit in the universal joint. In this respect, the reinforcing beam 5.1 includes two first longitudinally extending slide elements 26 in the form of two slide bars which are locked shape-wise but each slidably connected to a respective second slide element 27 in the form of a guide rail rigidly connected to the inner gyro element 23. The nut 28 of the setting device 4.1 is mounted rigidly in the inner gyro element 23, whereas the screw of said device rotates through the nut and is carried at one end by a support bearing 29.

As the screw of the setting device 4.1 is rotated by the setting motor 6.1, the motor holder 7.1, together with its joint part 8, will approach/retreat from the universal joint 3.1 and thus also the base, together with the reinforcing beam 5.1 displaceably mounted in the slide element 27, wherewith the positioning head will move within a working range. In this case, the screws of respective setting devices will function as pull-and-push transfer means between the positioning head and the base, whereas the reinforcing beams connected to the setting devices will act as means for taking-up bending stresses and torque stresses and to transfer forces laterally between the positioning head and the base.

Figure 3:
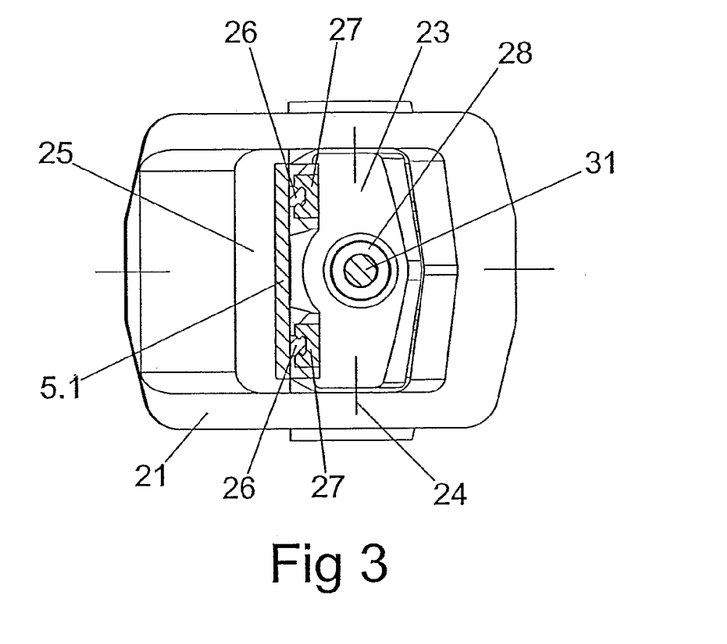
FIG. 3 is a sectional view of the reinforcing beam and the setting device at point F3 in FIG. 2.

FIG. 3 is a sectional view taken at the position F3 in FIG. 2. FIG. 3 shows the screw 31 of the setting device threaded in its nut 28, said nut being rigidly mounted in the inner gyro element 23 which, in turn, is mounted for rotation about the inner gyro axis 24 in the outer gyro element 21. The figure shows more clearly how the first slide element 26 of the reinforcing beam 5.1 is slidingly arranged while being shape-controlled in two other slide elements 27 permanently fastened at the inner gyro element 23. The figure also clearly shows the gyro window 25. It will also be clearly seen from the figure that the reinforcing beam 5.1 has a rectangular cross-sectional shape, meaning that the beam will have in a first direction a flexural rigidity that greatly exceeds the flexural rigidity of the beam in a direction at right angles to said first direction.

Figure 4:
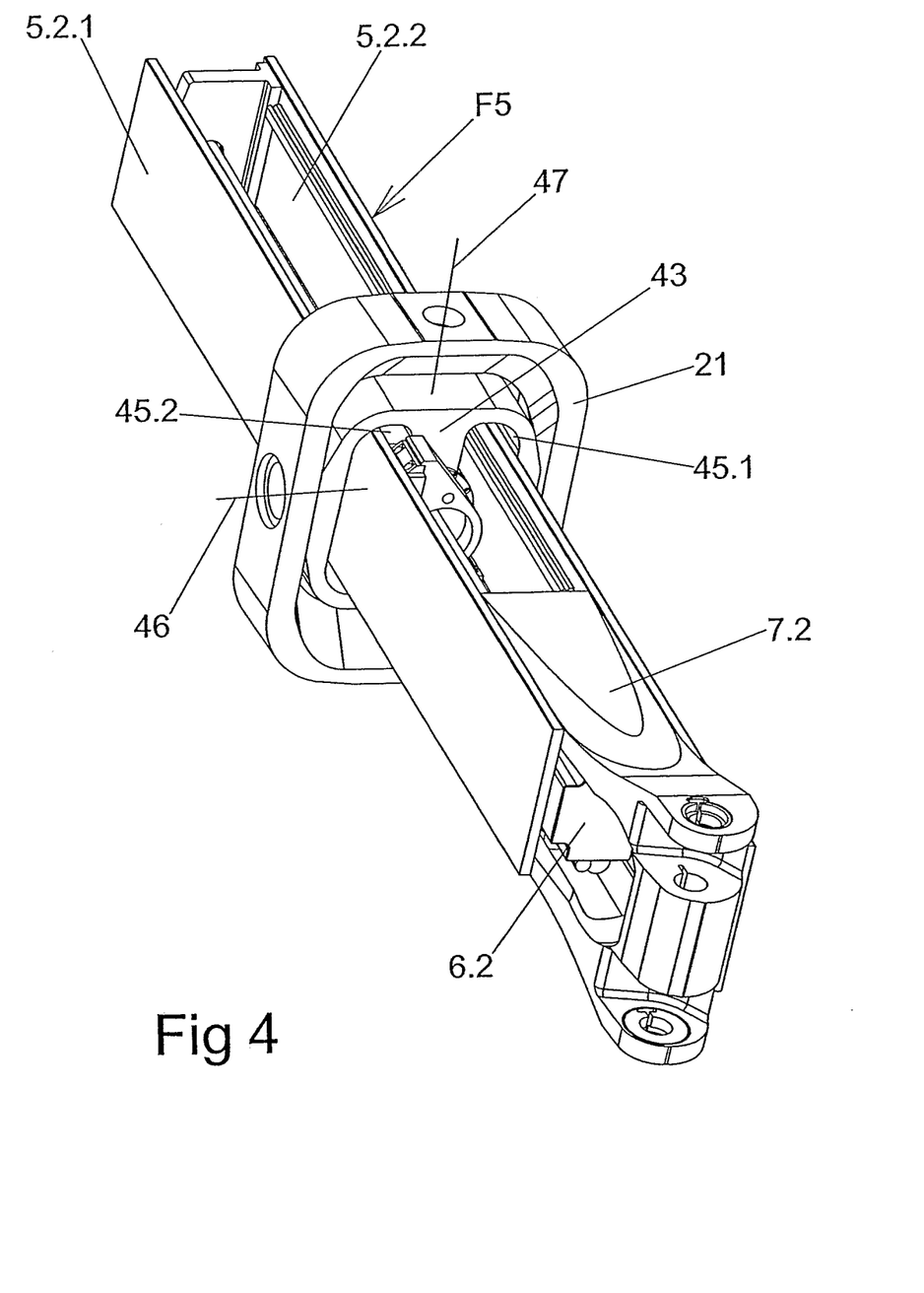
FIG. 4 illustrates another of the machine reinforcing beams, this beam being rotatable according to FIG. 1, and also shows connected setting devices.

FIG. 4 illustrates the other, and therewith the last, setting device 3.2 of said three setting devices, and also shows the two reinforcing beams 5.2.1, 5.2.2 connected to said setting device 3.2, said beams being firmly connected to the motor holder 7.2 on a respective side of the setting motor 6.2 and the setting device 12, which is obscured in the figure by one reinforcing beam 5.2.1. This setting device extends through an inner gyro element 43 which, correspondingly to the earlier described element, is mounted for rotation about an inner gyro axis 46 in an outer gyro element 21 which, in turn, is mounted for rotation about an outer gyro axis 47 in the base 2. However, the inner gyro element 43 includes a first and a second gyro window 45.1, 45.2 to which the two reinforcing beams 5.2.1, 5.2.2 each extend parallel with one another.

Figure 5:
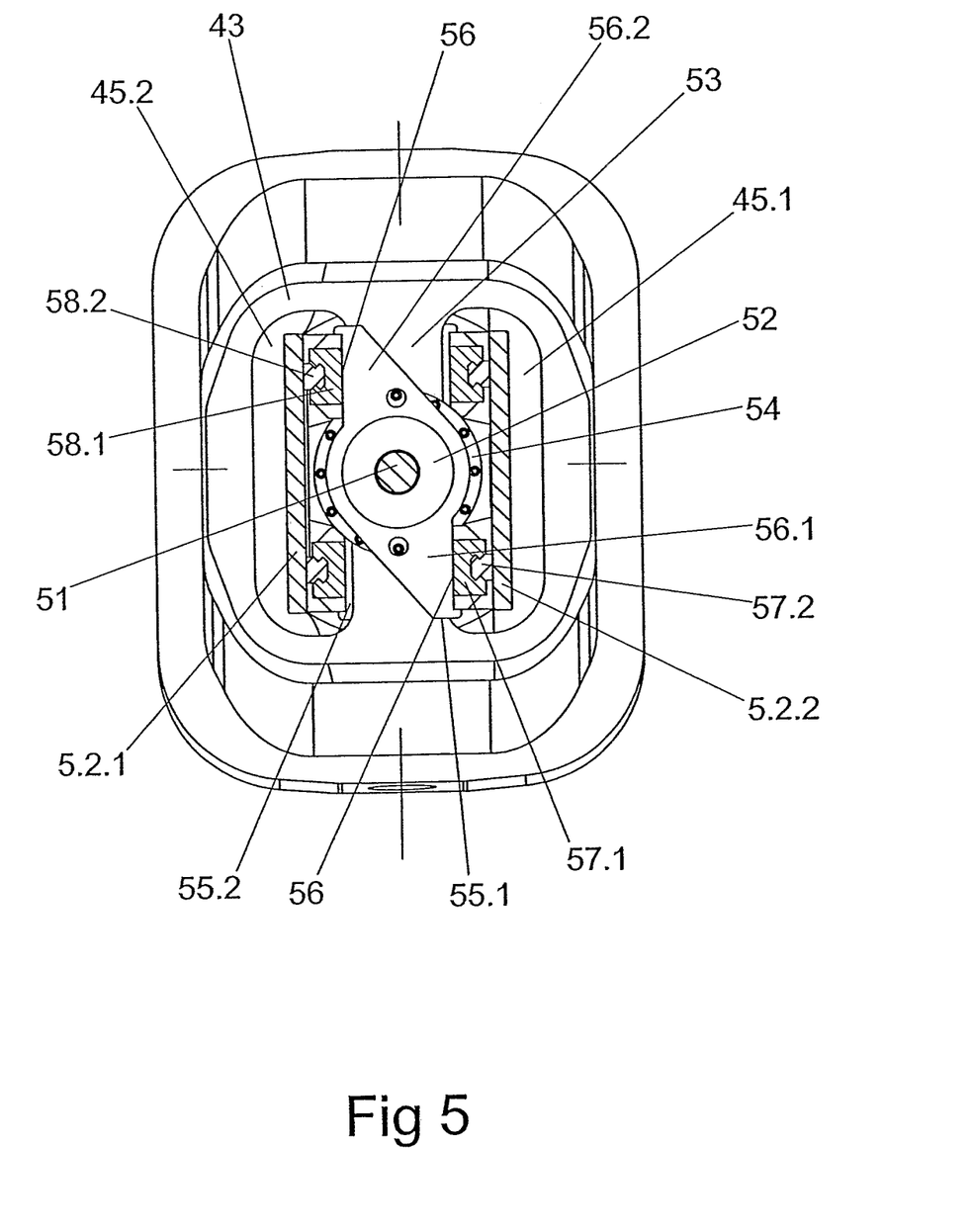
FIG. 5 is a sectional view of the reinforcing beam and the setting device at point F5 in FIG. 4.

FIG. 5 is a sectional view taken at the position F5 in FIG. 4. In the FIG. 5 illustration, the screw 51 of the setting device is in thread engagement with its nut 52, which is rigidly connected with a central waist 53 via a nut housing 54 in the inner gyro element 43, said waist being formed by said two gyro windows 45.1, 45.2 on each respective side of the waist. It will also be seen from the figure that each reinforcing beam 5.2.1, 5.2.2 is connected to the inner gyro element 43 via two tilt elements 55.1, 55.2, of which one tilt element 55.1 is mounted for tilting movement about the screw 51 of the setting device on one side of the inner gyro element 43, whereas the other tilt device 55.2 is mounted correspondingly for tilting movement about the screw 51 of said setting device on the other side of the inner gyro element 43. Each of the tilt elements 55.1, 55.2 is mounted in the nut housing 54 for tilting movement around the screw 51 of the setting device. One tilt element includes a first seating arm 56.1 and a second seating arm 56.2 disposed diagonally around the screw 51 of the setting device, with their seats orientated in opposite directions such that the first seating arm 56.1 holds a second slide element 57.1 and a first slide element 57.2 connected to one reinforcing beam 5.2.1, whereas the second seat arm 56.2 holds a second slide element 58.1 and a first slide element 58.2 in connection with the second reinforcing beam 5.2.2. Correspondingly, the second tilt element 55.2 on the other side of the waist 53 is formed and orientated so that each reinforcing beam 5.2.1, 5.2.2 will be connected to both tilt elements 55.1, 55.2 on respective sides of the waist 53 in accordance with FIG. 5. The two reinforcing beams 5.2.1, 5.2.2 are thus connected to the inner gyro element 43 via said tilt elements.

FIGS. 6a)-e) illustrate diagrammatically five different basic types of embodiments that lie within the scope of the invention. Using throughout in FIG. 6 reference signs corresponding to those used in the earlier described figures, the sub-figures denote schematic basic types of embodiments within the scope of the invention, wherewith the machine includes at least three setting devices 4.1, 4.2, 4.3 which can each be lengthened and shortened in their longitudinal directions, and wherewith each setting device is connected to a position head 11 via a first joint 8, 9, 10. Each setting device 4.1, 4.2, 4.3 is also connected to the base 2 via a universal joint 3.1, 3.2, 3.3, said positioning head 11 being movable within a working range in response to maneuvering of the setting devices. At least two movable reinforcing beams 5.1, 5.2 are connected to the positioning head 11 via an individual beam rotational bearing 100.1, 100.2, each of which having only one degree of freedom, i.e., the bearing functioning as a hinge. Each reinforcing beam 5.1, 5.2 is also arranged to slide transversely in a beam bearing 17.1, 17.2 in the base 2 as one or more of the setting devices 4.1, 4.2, 4.3 is lengthened or shortened. Each beam bearing 17.1, 17.2 is connected to the base 2 via a beam-universal-joint BU1, BU2, as earlier described. The beam bearing 17.2 of at least one movable reinforcing beam 5.2 is connected to an inner gyro element (e.g., 43) mounted in an outer gyro element (e.g., 21) of the beam bearing's respective beam-universal-joint BU2 mounted in the base 2, the inner gyro element being rotatable about an inner gyro axis (e.g., 46) and the outer gyro element being rotatable about an outer gyro axis (e.g., 47), such that the beam bearing 17.2 is also rotatable about the inner and outer gyro axes so as to be partly rotatable about an axis A that parallels the longitudinal axis of the movable at least one reinforcing beam 5.2, as illustrated in FIGS. 6a)-6e) with a double-headed arrow.

FIG. 6a) illustrates a first basic type of embodiment in which a first joint 8, 9, 10 of a setting device, for example the first setting device 4.1, constitutes a joint which is connected directly to the positioning head 11 and which is spaced at a distance from the beam rotational journal 100.1 or 100.2 of a reinforcing beam, for example the first reinforcing beam 5.1, said journal also being connected directly to the positioning head 11. Moreover, the beam-universal-joint BU1 and the beam bearing 17.1 of the first reinforcing beam 5.1 in the base 2 are distanced from the universal joint 3.1, 3.2, 3.3 of the setting device 4.1, 4.2, 4.3, said universal joint being rigidly connected to the base 2.

FIG. 6b) shows a second basic type of embodiment in which the first joint 8, 9, 10 of a setting device, for example the first setting device 4.1, constitutes a joint that is connected directly to the positioning head 11. A beam rotational bearing 100.1 or 100.2 of a reinforcing beam, for example the first reinforcing beam 5.1, is, in the case of this embodiment, rigidly connected to the setting device but spaced from the first joint 8, 9, 10 of the setting device. Correspondingly to the embodiment shown in FIG. 6a), the beam-universal-joint BU1 and the beam bearing 17.1 of the first reinforcing beam 5.1 in the base 2 are distanced from the universal joint 3.1, 3.2, 3.3 of the setting device 4.1, 4.2, 4.3, said universal joint also being rigidly connected to the base 2.

FIG. 6c) shows a third basic type of embodiment in which the first joint 8, 9, 10 of a setting device, for example the first setting device 4.1, is rigidly connected to a reinforcing beam, for example the first reinforcing beam 5.1. In this embodiment, the beam rotational bearing 100.1 of the reinforcing beam 5.1 is in direct connection with the positioning head 11. However, the first joint 8, 9, 10 of the setting device is distanced from the beam rotational bearing 100.1. Correspondingly to the embodiments shown in FIG. 6a) and FIG. 6b), the beam-universal-joint BU1 and the beam bearing 17.1 of the reinforcing beam 5.1 in the base 2 are distanced from the universal joint 3.1, 3.2, 3.3 of the setting device 4.1, 4.2, 4.3, said universal joint being rigidly connected to the base 2.

FIG. 6d) illustrates a fourth basic type of embodiment in which the first joint 8, 9, 10 of a setting device, for example the first setting device 4.1, and the beam rotational bearing 100.1, 100.2 of a reinforcing beam, for example the first reinforcing beam 5.1, constitute the same joint which is placed in direct connection with the positioning head 11. Correspondingly to the embodiment shown in FIGS. 6a), 6b) and 6c), the beam-universal-joint BU1 and the beam bearing 17.1 of the first reinforcing beam 5.1 in the base 2 are distanced from the universal joint 3.1, 3.2, 3.3 of the setting device 4.1, 4.2, 4.3, said universal joint being rigidly connected to the base 2.

FIG. 6e) illustrates a fifth basic type of embodiment in which the first joint 8, 9, 10 of a setting device, for example the first setting device 4.1, and a beam rotational bearing 100.1, 100.2 of a reinforcing beam, for example the first reinforcing beam 5.1 constitute the same joint which is placed in direct connection with the positioning head 11. The universal joint 3.1, 3.2, 3.3 of the setting device 4.1, 4.2, 4.3 is rigidly connected to the base 2 and consists of the beam-universal-joint of said reinforcing beam and beam bearing in the base 2. The reinforcing beam thus moves together with the setting device in the case of this embodiment.

This fifth basic type of embodiment includes a setting device in combination with a reinforcing beam according to the embodiment described above in detail with reference to FIGS. 1-5 by way of introduction, this embodiment belonging to the fifth basic type of embodiment.

The beam-universal-joints BU1 and BU2 are so-called cardan joints having two degrees of freedom, where the kinematic behaviour of such a joint is such that the rotational angle at the outer gyro axis 22 is dissimilar to the rotation of the inner gyro axis 24 due to the angle therebetween, a so-called rotational angle difference. When the beam rotational bearings 100.1, 100.2 that have only one degree of freedom are placed at right angles to each other, the rotational angle differences in respect of BU1 and BU2 will counteract each other, therewith resulting in kinematical locking of the machine unless at least one reinforcing beam is permitted to rotate, as shown by the following equation with associated FIG. 7.

Figure 7:
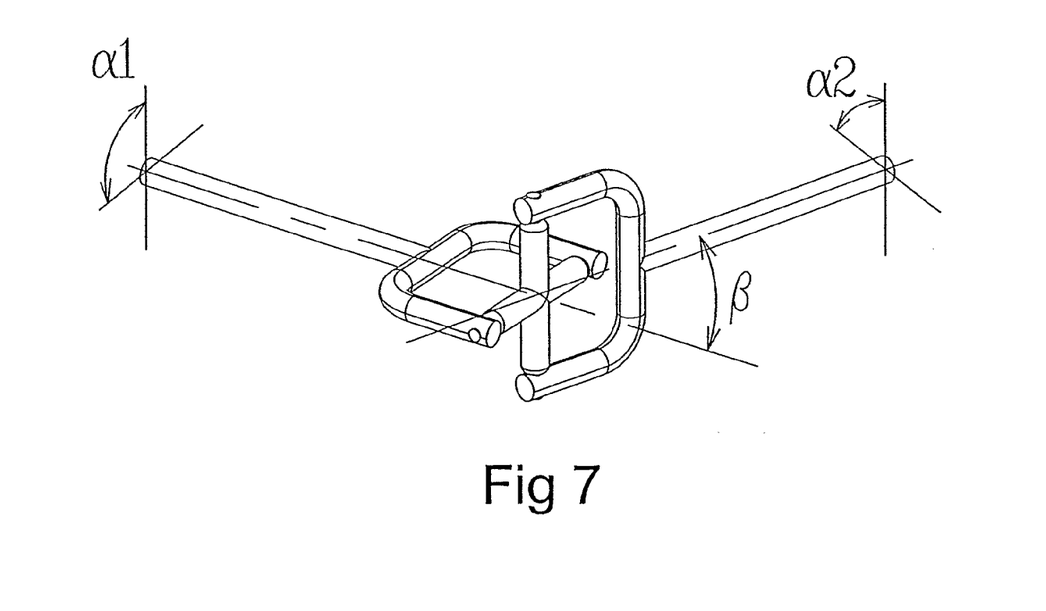
FIG. 7 illustrates a universal joint in the form of a cardan joint that has two degrees of freedom.

The rotational angle difference can be expressed as:

$$\varphi_\kappa = \alpha 2 - \alpha 1$$
$$\varphi_\kappa = \arctan\left(\frac{1}{\cos\beta}\tan\alpha 1\right) - \alpha 1$$

where β is the angle between the outer gyro axis and the inner gyro axis, α1 is the rotation of the outer gyro axis and α2 is the rotation of the inner gyro axis.

The invention claimed is:
1. A parallel-kinematical machine comprising:
at least three setting devices which can be lengthened and shortened individually,
a positioning head,
at least three first joints, each setting device being connected to the positioning head via a corresponding one of the at least three first joints,
a base,
at least three universal joints, each setting device being connected to the base via a corresponding one of the at least three universal joints, the positioning head being movable within a working range in response to changes in length of one or more of the setting devices,
at least two movable reinforcing beams,
at least two beam rotation bearings, each movable reinforcing beam being connected to the positioning head via a corresponding one of the at least two beam rotation bearings, each beam rotation bearing having solely one degree of freedom of movement,
at least two beam bearings, each movable reinforcing beam slidable in a corresponding beam bearing transversely with respect to the base when one or more of the setting devices is lengthened or shortened, and at least two beam-universal-joints, each movable reinforcing beam and its corresponding beam bearing being mounted in the base via a corresponding beam-universal-joint, the corresponding beam-universal-joint of at least one of the movable reinforcing beams including a corresponding outer gyro element rotatably mounted in the base and a corresponding inner gyro element rotatably mounted in the outer gyro element, the inner gyro element being rotatable about an inner gyro axis and the outer gyro element being rotatable about an outer gyro axis, and the corresponding beam bearing of the at least one of the movable reinforcing beams (a) being rotatably connected via a tilt apparatus to the corresponding inner gyro element, the corresponding beam bearing and the at least one of the movable reinforcing beams being (b) rotatable about the inner and outer gyro axes and rotatable within the inner gyro element, so as to be (c) partly rotatable with respect to the inner gyro element, and thus the base, about an axis that parallels the longitudinal axis of the movable at least one reinforcing beam as the at least one movable and rotatably connected reinforcing beam slides transversely in its corresponding beam bearing to move with the positioning head when one or more of the setting devices is lengthened or shortened to thereby move the positioning head within the working range.

2. The parallel-kinematical machine according to claim 1, wherein at least one beam rotation bearing is a first joint.

3. The parallel-kinematical machine according to claim 2, wherein at least one of the at least two beam-universal-joints in which the at least two movable reinforcing beams are mounted is/are at least one of the at least three universal joints in which the at least three setting devices are connected to the base.

4. The parallel-kinematical machine according to claim 1, wherein a second one of the beam rotation bearings corresponding to a second one of the at least movable reinforcing beams is rigidly connected to at least one of the setting devices.

5. The parallel-kinematical machine according to claim 1, wherein one of the first joints corresponding to one of the setting devices is connected to a second one of the reinforcing beams.

6. The parallel-kinematical machine according to claim 1, wherein each of the universal joints and each of the beam-universal-joints includes a corresponding outer gyro element which is mounted in the base for rotation about a corresponding outer gyro axis, and with a corresponding inner gyro element which is mounted in the corresponding outer gyro element for rotation about a corresponding inner gyro axis at right angles to the corresponding outer gyro axis.

7. The parallel-kinematical machine according to claim 6, wherein each beam bearing is connected to either a corresponding one of the inner gyro elements of the universal joints or a corresponding one of the inner gyro elements of the beam-universal-joints.

8. The parallel-kinematical machine according to claim 1, wherein each reinforcing beam has in a first direction a flexural rigidity which is greater than its flexural rigidity in a direction at right angles to the first direction.

9. The parallel-kinematical machine according to claim 8, wherein each reinforcing beam has a generally rectangular cross-sectional shape.

10. The parallel-kinematical machine according to claim 1, wherein one of the setting devices is connected to two reinforcing beams.

11. The parallel-kinematical machine according to claim 1, wherein each of the three setting devices is mounted in a corresponding universal joint which includes a corresponding outer gyro element rotatably mounted in the base and a corresponding inner gyro element rotatably mounted in the corresponding outer gyro element, and wherein at least one of the three setting devices is a screw-nut-mechanism in which the screw or nut is rigidly connected to the setting device's corresponding inner gyro element.

12. The parallel-kinematical machine according to claim 11, wherein the screw of the mechanism is driven at one end by a setting device motor and at the other end supported by a bearing.

13. The parallel-kinematical machine according to claim 12, wherein the setting device motor is mounted in a motor holder with one end formed as one part of the first joint and provided with connection surfaces to which at least one of the reinforcing beams is fastened.

14. The parallel-kinematical machine according to claim 11, wherein the at least two reinforcing beams comprise three reinforcing beams, and wherein the beam rotation bearings of two of the three reinforcing beams have bearing axes which are orientated parallel with one another.

15. The parallel-kinematical machine according to claim 1, wherein at least one of the three setting devices is a linear motor.

16. The parallel-kinematical machine according to claim 15, wherein part of the linear motor is comprised of at least one of the reinforcing beams.

17. The parallel-kinematical machine according to claim 1, wherein each reinforcing beam includes at least one longitudinally extending first slide element, which is connected to a second slide element, and wherein each reinforcing beam's corresponding beam-universal-joint includes a corresponding outer gyro element rotatably mounted in the base and a corresponding inner gyro element rotatably mounted in the corresponding outer gyro element, the second slide element being connected to the corresponding inner gyro element.

18. The parallel-kinematical machine according to claim 17, wherein the second slide element is either fixedly connected to the inner gyro element or guided in relation to the inner gyro element.

19. The parallel-kinematical machine according to claim 1, wherein the beam rotation bearings of the at least two reinforcing beams have bearing axes which are orientated at right angles to one another.

20. The parallel-kinematical machine according to claim 1, wherein the corresponding inner gyro element of the corresponding beam-universal-joint of the at least one of the movable reinforcing beams includes a gyro window within which the at least one of the movable reinforcing beams can rotate.

21. The parallel-kinematical machine according to claim 1, wherein the corresponding beam-universal-joint of the at least one of the movable reinforcing beams is one of the three universal joints in which one of the three setting devices is mounted, and wherein the mounted setting device is a screw-nut-mechanism in which the nut is rigidly connected to a central waist of the universal joint's corresponding inner gyro element.

22. The parallel-kinematical machine according to claim 21, wherein the tilt apparatus is comprised of first and second tilt elements, and wherein the first and second tilt elements and thereby the corresponding beam bearing of the at least one of the movable reinforcing beams connected to the first and second tilt elements rotate about the screw.

23. The parallel-kinematical machine according to claim 22, wherein each of the first and second tilt elements includes a seating arm that rotates about the screw that holds a second slide element and that engages a first slide element connected to the at least one of the movable reinforcing beams.

24. A parallel-kinematical machine comprising:
a positioning head,
a base,
a plurality of setting devices,
a plurality of first joints, each setting device being connected to the positioning head via a corresponding one of the plurality of first joints,
a plurality of universal joints,
each setting device being connected to the base via a corresponding one of the plurality of universal joints,
each setting device being capable of being individually lengthened or shortened between the positioning head and the base, the positioning head being movable with respect to the base within a working range in response to changes in length of one or more of the setting devices,
a plurality of movable reinforcing beams, each movable reinforcing beam being connected to the positioning head via a corresponding one of the plurality of first joints, each first joint having solely one degree of freedom of movement,
a plurality of beam bearings, each beam bearing being mounted in the base via a corresponding one of the plurality of universal-joints, each movable reinforcing beam being slidable in a corresponding one of the plurality of beam bearings transversely with respect to the base when one or more of the setting devices is lengthened or shortened,
the corresponding universal joint of at least one of the movable reinforcing beams including a corresponding outer gyro element rotatably mounted in the base and a corresponding inner gyro element rotatably mounted in the corresponding outer gyro element, the inner gyro element being rotatable about an inner gyro axis and the outer gyro element being rotatable about an outer gyro axis, and
the corresponding beam bearing of the at least one movable reinforcing beam (a) being rotatably connected via a tilt apparatus to the corresponding inner gyro element, such that the corresponding beam bearing and the at least one movable reinforcing beam are (b) rotatable about the inner and outer gyro axes and rotatable within the corresponding inner gyro element, so as to be (c) partly rotatable with respect to the inner gyro element, and thus the base, about an axis that parallels the longitudinal axis of the movable at least one reinforcing beam as the at least one movable and rotatably connected reinforcing beam slides in its corresponding beam bearing transversely with respect to the base to move with the positioning head when one or more of the setting devices is lengthened or shortened to thereby move the positioning head within the working range.

25. The parallel-kinematical machine according to claim 24, wherein each of the universal joints includes a further corresponding outer gyro element which is mounted in the base for rotation about a further corresponding outer gyro axis, and with a further corresponding inner gyro element which is mounted in the further corresponding outer gyro element for rotation about a further corresponding inner gyro axis at right angles to the further corresponding outer gyro axis.

26. The parallel-kinematical machine according to claim 24, wherein the corresponding inner gyro element of the corresponding first joint of the at least one movable reinforcing beam includes a gyro window within which the at least one movable reinforcing beam can rotate.

27. The parallel-kinematical machine according to claim 24, wherein one of the three setting devices is mounted in the corresponding universal joint of the at least one movable reinforcing beam, and wherein the mounted setting device is a screw-nut-mechanism in which the nut is rigidly connected to a central waist of the universal joint's corresponding inner gyro element.

28. The parallel-kinematical machine according to claim 27, wherein the tilt apparatus is comprised of first and second tilt elements, and wherein the first and second tilt elements, and thereby the corresponding beam bearing of the at least one of the movable reinforcing beams connected to the first and second tilt elements, rotate about the screw.

29. The parallel-kinematical machine according to claim 28, wherein each of the first and second tilt element includes a seating arm, which rotates about the screw, which holds a second slide element and which engages a first slide element connected to the at least one movable reinforcing beam.

30. The parallel-kinematical machine according to claim 24, wherein each reinforcing beam includes at least one longitudinally extending first slide element, which is connected to a second slide element, and wherein each reinforcing beam's corresponding universal joint includes a further corresponding outer gyro element rotatably mounted in the base and a further corresponding inner gyro element rotatably mounted in the further corresponding outer gyro element, the second slide element being connected to the further corresponding inner gyro element.

31. The parallel-kinematical machine according to claim 30, wherein the second slide element is either fixedly connected to the inner gyro element or guided in relation to the inner gyro element.

32. The parallel-kinematical machine according to claim 24, wherein the first joint connecting the at least one movable reinforcing beam to the positioning head has a joint axis that is oriented at right angles to joint axes of the other first joints connecting the other movable reinforcing beams to the positioning head.

* * * * *